Oct. 21, 1941.   J. M. GWINN, JR   2,260,022
AIRCRAFT
Filed Jan. 8, 1940
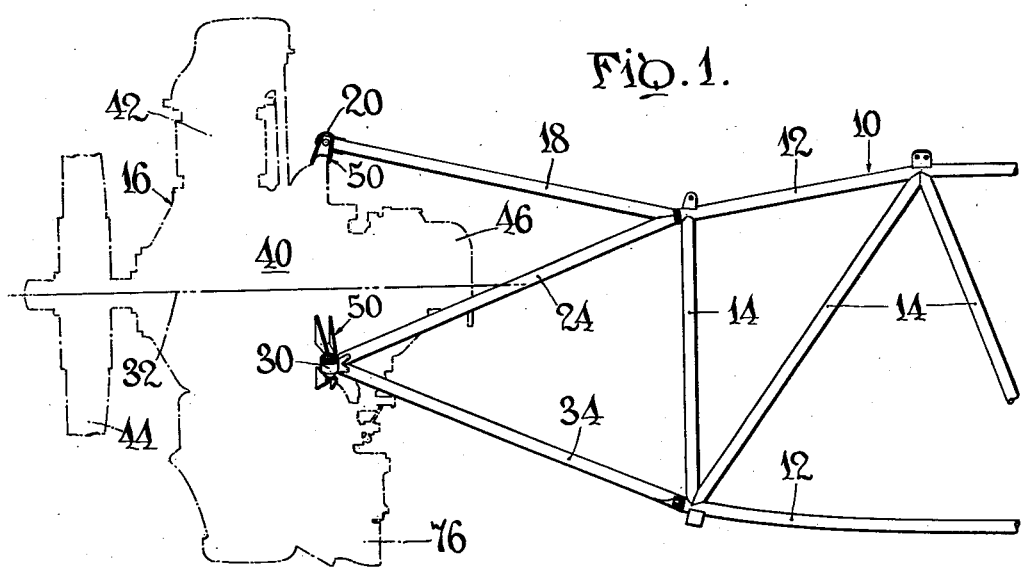
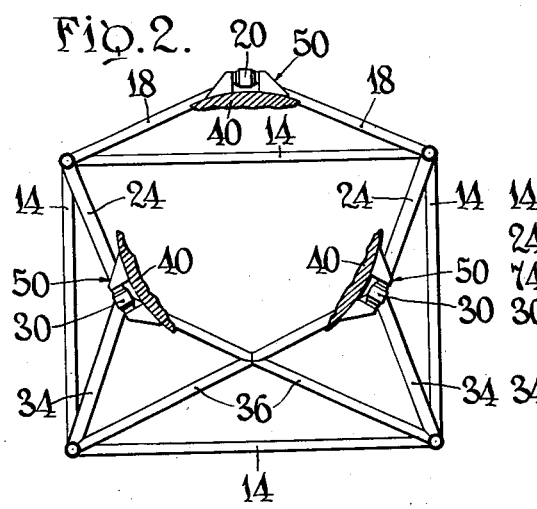
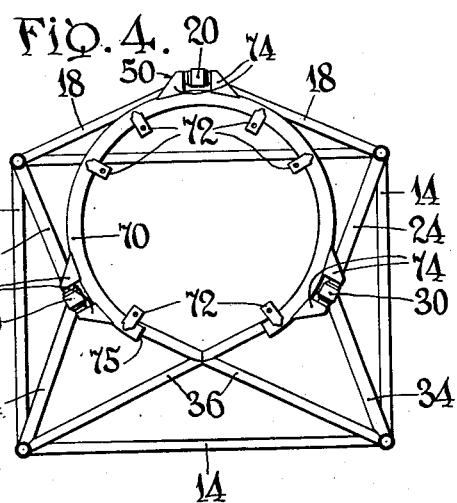
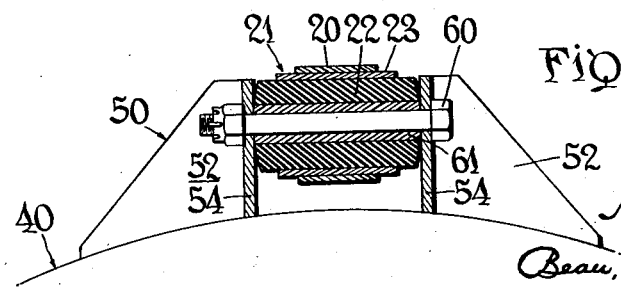
INVENTOR
JOSEPH M. GWINN, JR.
BY
Beau, Brooks, Buckley & Beau.
ATTORNEYS Patented Oct. 21, 1941

2,260,022

UNITED STATES PATENT OFFICE 2,260,022

AIRCRAFT

Joseph M. Gwinn, Jr., Buffalo, N. Y., assignor to Brewster Aeronautical Corp., Long Island City, N. Y.

Application January 8, 1940, Serial No. 312,892

6 Claims. (Cl. 248—5)

This invention relates to improvements in aircraft, and more specifically to an improved form of engine mounting structure therefor.

A prime object in aircraft engine mounting practice is to provide a strong and durable engine support by means of a structure that is as simple and light in weight as possible. Also, the engine should be readily detachable from the mount, and the interconnection devices that are employed should preferably be of proper shock and vibration absorbing character. The usual form of engine mounting arrangement for radial type engines comprises a truss structure including a ring member extending from the fuselage and embracing the engine crank case and a plurality of connection devices integral with the engine crank case and extending into registry with the ring member for demountable connection therewith.

Preferably, the plane of the points of connection between the engine and the mounting ring is disposed as close as possible to the fore and aft center of gravity of the engine with a view to minimizing vibration under operating conditions. Also, it is considered desirable that this mounting ring and the points of engine mounting connection therewith be located as close as possible to the crank case structure per se with a view to minimizing possibility of vibrational movement of the engine longitudinally of the fuselage. Hence, the engine mounting ring is usually designed to closely fit the peripheral surface of the engine crank case in the region of the mounting connection. This frequently complicates and makes expensive the processes of assembly and/or disassembly of the engine relative to the fuselage by making it necessary that the engine be stripped of certain of its accessory devices before it can be moved relative to the fuselage. In such case, for example during manufacture of the airplane, the engine will be initially installed in the fuselage without many of its accessory devices, and the engine crew will subsequently attach the omitted accessories by working through the fuselage frame structure. Similarly, when effecting major engine repairs the engine crew will be required to first remove the accessory units interfering with withdrawal of the engine from the mount before the engine can be removed to a work bench for convenient and efficient engine repair crew operation.

It is one of the objects of the present invention to provide an improved and simplified engine mounting system that will attain the desirable features referred to hereinabove without involving the disadvantages of the prior forms of engine mounts. Another object of the invention is to provide an improved and simplified strut system for connecting an aircraft engine to the fuselage per se in a more efficient manner from the standpoint of amount of structural material used. Another object of the invention is to provide an improved engine vibration and shock absorbing connection between the engine and the mounting structure. Another object of the invention is to provide a simplified and improved form of engine mounting structure adapted to accommodate engines of various mounting attachment dimensions. Other objects and advantages of the invention will appear from the specification herein.

In the drawing:

Fig. 1 is a side elevation of an airplane fuselage and power plant mounting structure of the invention, showing an engine of the radial cylinder type installed therein;

Fig. 2 is a front elevation of the structure of Fig. 1;

Fig. 3 is a front elevation with portions cut away showing the details of attachment of the engine to the engine mount structure; and Fig. 4 is a front elevation of another form of engine mounting structure of the invention which is adapted to accommodate engines of different dimensions.

In Figs. 1 and 2 an aircraft fuselage is designated generally as 10 and comprises a group of substantially parallel longerons 12 and transverse bracing elements 14 all of which are formed of steel tubing or the like and welded in the form of a box truss. The engine mounting frame comprises generally a series of struts connected to and extending forwardly from opposite portions of the fuselage structure to three points of connection with the aircraft engine 16. The engine mounting structure includes a pair of top struts 18 connected at their rear ends to the fuselage and extending forwardly therefrom in converging relation and into welded connection with a horizontally disposed engine connection fitting 20, thus forming a triangular frame with the fitting 20 at the apex thereof. The fitting 20 is of sleeve-like form, having an opening therethrough within which a vibration-absorbing device 21 is fitted (Fig. 3). The vibration-absorbing device comprises a bored rubber bushing 22 which is vulcanized in connection with an embracing collar 23; the collar 23 being press-fitted into the fitting 20.

A second pair of opposed struts 24 are connected at their rear ends to corresponding opposite portions of the fuselage 10 and extend forwardly and downwardly therefrom in continued spaced relationship to points of welded connection with corresponding opposite lower engine connection fittings 30. The fittings 30 are identical in form to the fitting 20 and are arranged in a common vertical plane therewith and in such manner as to provide a three-point mounting connection system for the engine 16; the fittings 20 and 30 being preferably so arranged as to be equidistant from one another and radially about the engine center line 32 (Fig. 1). Additional bracing means to the fittings 30 are provided in the form of corresponding pairs of lower strut members 34 and 36 which extend forwardly from opposite lower front portions of the fuselage 10 in such manner as to provide, in combination with the corresponding struts 24, individual trusses of pyramidal form with the fittings 30 at the apexes thereof.

Thus, each of the fittings 30 is braced relative to the front end of the fuselage 10 by means of three strut members numbered 24, 34 and 36 respectively; and by reason of the relative arrangement of the strut members the fittings 30 are braced against movement relative to the fuselage in longitudinal, vertically transverse, and horizontally transverse directions.

The engine 16 is shown as including an engine crank case 40; cylinders 42 extending radially therefrom; a propeller 44 mounted at the forward end of the engine shaft; and a plurality of engine accessory devices 46 such as magneto, starter, and the like. At three positions at the outer surface of the crank case and in registry with the fittings 20 and 30 mounting lugs 50 are attached rigidly to the crank case 40 and extend radially therefrom for connection with the mounting frame. Each lug 50 comprises a pair of ears 52 having spaced parallel flange portions 54 (Fig. 3) bored to receive engine mounting pins 60 which are disposed therein and inserted through the rubber shock absorbers 22 of the fittings 20 and 30. It will be noted that the opposed flanges 54 are spaced from the ends of the collars 23 and that the rubber bushings 22 are in part coextensive in length with the space between the flanges 54. Thus space is provided at each end of the fittings between the metal parts and the lugs 50 to allow for relative rotational movement therebetween about the engine crank center line, and the bushings 22 are enabled to provide vibration-absorbing means between the engine and the mounting frame in directions radially and axially of the pins 60. A metal sleeve 61 is preferably vulcanized to the rubber bushings 22 internally thereof for slide fitting connection with the pins 60.

It will be understood that the engine is braced relative to the fuselage at the points of the fittings 30 in all directions except for rotation around a line through the fittings 30—30, and that the struts 18 effectively brace the engine against such rotation. The strut system employs a minimum number of structural members for the engine bracing action and thus effects a saving in weight of material used; and it will be seen that the strut arrangement is of such character that if anyone of the strut elements becomes damaged the mounting frame will nevertheless constitute a complete truss.

In connection with the mounting of an aircraft engine through means of vibration-absorbing connection devices it is highly desirable to mount the engine in its supporting frame in such manner that the natural frequencies of engine movement in its elastic mounting do not coincide with the frequencies of the vibration-exciting impulses of the engine within the normal range of operating speeds. Or, in other words, the object is to permit the engine to move upon the resilient connection devices in such manner as to avoid transmission of shock to the fuselage and at the same time to avoid resonance effects. The elastic bushings 22 of the structure of the invention are so formed as to be several times more rigid against radial deflection than against axial deflection because this has been found to provide the correct ratio of rigidity to inertia. Thus it will be seen that the stated objects and advantages are obtained in the structure of the invention through use of a reduced number of structural parts and that need for a continuous row of engine mounting connections about the engine is eliminated. Thus, direct connection of the mounting strut members to the engine crank case is made entirely practicable, and increased accessibility of the engine relative to the fuselage is provided.

Although the drawing and the description hereinabove refer to a form of the invention which involves the location of the fitting 20 at the top center of the structure and of the fittings 30 at opposite side lower portions thereof, it will be understood that the relative location of these points of engine mounting attachment about the engine center line 32 may be changed in any desired manner. For example, the fittings 30 and their corresponding supporting strut devices may be arranged at the upper portion of the structure and the fitting 20 and its supporting strut devices may be at the lower center portion thereof, and in such case the structure will provide the features and advantages previously referred to. Or, the connection points may be disposed in any other desired relative arrangement about the engine center line and the features and advantages hereinabove referred to will be attained by reason of the provision of a pair of engine connection points which are braced relative to the fuselage against movement in all directions except in rotation about a line drawn between said connection points, and a third point of engine connection which is spaced from said line through said pair of connection points and braced against engine rotation thereabout.

It will be understood that although the invention has been illustrated and described herein as being in connection with a fuselage of rectangular sectional form, the engine mounting structure of the invention may also be employed with equal facility in connection with fuselages of any other sectional form; including, for example, conventional monocoque structures. It will also be understood that although the strut members 18, 24, 34 and 36 are described hereinabove as being of metallic tubular form, any other kind of material may be used in lieu thereof, such as metal of angular section, or wood, or the like. It will also be understood that the joints between the various strut and fitting elements may be provided by the use of welding, rivets, bolts, or any other suitable means. It will be seen that the engine mount strut elements of the invention carry the connection fitting devices at points closely adjacent to the engine crank case and do not interfere with the use of engine accessory devices mounted externally of the crank case, and that the arrangement readily permits location of the connection fitting devices close to the fore and aft plane of the center of gravity of the engine or in any other desired relation with respect thereto.

Fig. 4 illustrates a form of the engine mounting structure of the invention which is adapted for use in connection with an engine having crank case dimensions smaller than those of the engine of Figs. 1 and 2. In this case, an adaptor ring 70 is mounted upon the engine crank case by means of brackets 72 in such manner as to be unitary with the crank case. The adaptor ring 70 is provided with outstanding lugs 74 as integral parts thereof, and the lugs 74 are similar in nature to the lugs 52 of Figs. 1 to 3 and are arranged in registry with the fittings 20 and 30 of the mounting frame for reception of the bushings and connection bolts 60 therebetween in the manner previously described. It will be noted that the adaptor ring 70 need not be a continuous structure and may be cut away as at 75 (Fig. 4) to accommodate an extending portion of the engine; as for example, the carburetor 76 (Fig. 1). The adaptor 70 is nevertheless an integral part of the engine unit; and it will be seen that the engine mount connection points are disposed immediately adjacent integral portions of the engine structure as in the form of construction illustrated in Figs. 1 to 3, and that the engine and adaptor ring and mounted accessories may be inserted and/or withdrawn from the mounting frame as a unit without interference between the mounting struts and the engine accessory devices. It is contemplated that the lugs 74 may be laterally offset to shift the position of the engine fore or aft relative to the fitting 20—30 in any desired manner.

Although only a limited number of forms of the invention have been shown and described in detail, it will be apparent to those skilled in the art that the invention is not so limited but that various changes may be made therein without departing from the spirit of the invention or from the scope of the appended claims.

I claim:

1. In combination, an aircraft body, an aircraft engine, a mount for said engine comprising essentially only three engine mounting connection devices disposed in spaced relation about the longitudinal center line of said engine, means detachably mounting said engine upon said connection devices, a pyramidal truss structure extending between said aircraft body and each of two of said connection devices and bracing the latter against movement in all directions relative to said body whereby said engine is braced against all movement relative to said body fuselage except in rotation about a line drawn through said pair of connection devices, and a bracing structure extending between and connecting said body and the other of said connection devices in such manner as to restrain said rotational movement of said engine.

2. In combination, an aircraft, an aircraft engine, a mounting structure for said engine comprising essentially only three engine mounting connection devices disposed in spaced relation about the longitudinal center line of said engine, means detachably mounting said engine upon said connection devices, a pyramidal truss structure comprising strut members extending between said aircraft and each of two of said connection devices and trussing the latter in all directions relative to said aircraft whereby said engine is braced against all movement relative to said aircraft except in rotation about a line drawn through said pair of connection devices, and strut members extending between and connecting said aircraft and the other of said connection devices in such manner as to restrain said rotational movement of said engine, said detachable mounting means having resilient portions and being of vibration absorbing character.

3. In an aircraft, an engine, an engine mounting device comprising essentially an adaptor ring unitary with said engine and having only three shock absorbing engine connection fittings unitary therewith and extending outwardly therefrom in spaced relation therearound, a pair of pyramidal frames composed of strut means connected respectively at their apex ends to two of said fittings and extending into rigid connection at the other of their ends with said aircraft, and a triangular frame composed of strut means connected at its apex end to the other of said fittings and extending therefrom into rigid connection at its base end with said aircraft.

4. An engine mounting structure for an aircraft having a fuselage of which a portion defines a quadrilateral base for said mounting structure, struts connected to said fuselage at the corners of said quadrilateral base and extending outwardly therefrom in such manner as to provide a pair of generally pyramidal frames and a single triangular frame, said frames having their apexes disposed in spaced relation, engine connection fittings integral with said strut members at each of said apexes, an engine, and means detachably connecting said engine and said engine connection fittings.

5. In an aircraft, an engine having three points of support in spaced relation about the longitudinal center line of the engine, a pair of pyramidal trusses respectively detachably connected at their apex ends to the engine at two of said three points of support and extending at their bases into rigid connection with said aircraft, and brace means having rigid connection with said aircraft and a detachable connection to the engine at the third of said three points of support.

6. In an aircraft, an engine having three points of support in spaced relation about the longitudinal center line of the engine, with one of said points uppermost and disposed substantially in the vertical plane of said center line, and the other two points disposed laterally thereof and below said center line, an engine mounting having four connection points to the aircraft including two vertically spaced points on each side of said plane, said mounting comprising a strut extending from each of the upper two mounting connection points to the upper engine support point, a strut extending from each of the upper mounting connection points to one of the lower engine support points, and struts extending from each of the lower mounting connection points to both of the lower engine support points.

JOSEPH M. GWINN, Jr.